Figure 1:
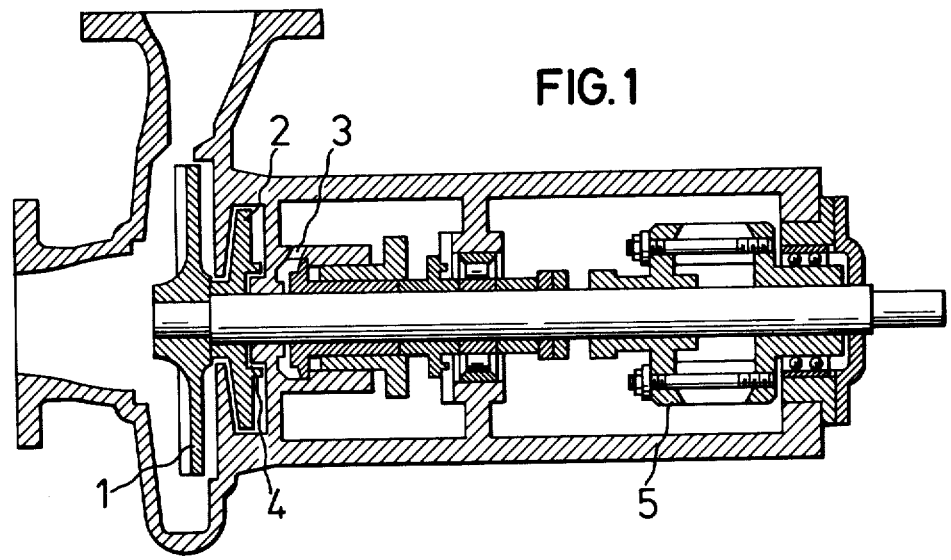

United States Patent [19]

Kuhls et al.

[11] 4,369,266

[45] Jan. 18, 1983

[54] CONCENTRATED DISPERSIONS OF FLUORINATED POLYMERS AND PROCESS FOR THEIR PREPARATION

[75] Inventors: Jürgen Kuhls; Eduard Weiss, both of Burghausen, Fed. Rep. of Germany

[73] Assignee: Hoechst Aktiengesellschaft, Frankfurt, Fed. Rep. of Germany

[21] Appl. No.: 125,463

[22] Filed: Feb. 28, 1980

[30] Foreign Application Priority Data

Mar. 1, 1979 [DE] Fed. Rep. of Germany ....... 2908001

[51] Int. Cl.³ .......................... C08L 3/00; C08L 3/16
[52] U.S. Cl. ...................................... 523/332; 523/310; 523/318; 523/335; 523/343; 524/463; 524/546; 528/482; 528/502
[58] Field of Search .............. 528/502, 482; 523/310, 523/318, 332, 335, 343; 524/463, 546

[56] References Cited

U.S. PATENT DOCUMENTS

| | | | |
|---|---|---|---|
| 2,559,752 | 7/1951 | Berry | 260/29.6 F |
| 3,037,953 | 6/1962 | Marks et al. | 260/29.6 F |
| 3,301,807 | 1/1967 | Hoashi | 260/29.6 F |
| 3,316,201 | 4/1967 | Hahn et al. | 260/29.6 F |
| 3,925,292 | 12/1975 | Holmes | 260/29.6 F |

FOREIGN PATENT DOCUMENTS 642025  8/1950  United Kingdom .

*Primary Examiner*—Harold D. Anderson
*Attorney, Agent, or Firm*—Connolly and Hutz

[57] ABSTRACT

Aqueous colloidal dispersions of fluorinated polymers can be concentrated, after adding a stabilizing emulsifier, to high solids contents by ultrafiltration over customary semi-permeable membranes if pumps which keep the dispersion free from contact with components which cause frictional forces are used for conveying the dispersion. A considerable proportion of the stabilizing emulsifier added and high proportions of the fluorine-containing emulsifier originally contained in the fluorinated polymer dispersion from the emulsion polymerization can be removed via the aqueous permeate. The fluorine-containing emulsifier can be recovered by a downwstream basic anion exchanger and the stabilizing emulsifier contained in the filtrate flowing out of the anion exchanger can be concentrated in this filtrate by reverse osmosis and optionally recycled into the ultrafiltration process. Fluorinated polymer dispersions which, in addition to having a high solids content, are distinguished by particularly low contents of fluorine-containing emulsifier and of stabilizing emulsifier can be obtained. The process can be applied to all known aqueous, colloidal dispersions of fluorinated homopolymers and copolymers.

13 Claims, 4 Drawing Figures

CONCENTRATED DISPERSIONS OF FLUORINATED POLYMERS AND PROCESS FOR THEIR PREPARATION

The invention relates to concentrated fluorinated polymer dispersions and to a process for concentrating colloidal fluorinated polymer dispersions which contain fluorine-containing emulsifiers, with the addition of stabilizing emulsifiers, it being possible for the fluorine-containing emulsifier and the stabilizing emulsifier optionally to be recovered separately.

Colloidal dispersions of fluorinated polymers are prepared by emulsion polymerization of the corresponding fluorinated monomers (or comonomers in the case of fluorinated copolymer dispersions) in the presence of fluorine-containing emulsifiers, as described, for example, in U.S. Pat. No. 2,559,752. Polymer solids contents from 5 up to 40, at most up to 45, % by weight can usually be achieved in this process or similar emulsion polymerization processes. However, for most intended commercial applications, for example for the formation of coatings and coverings, it is desirable or even necessary to employ fluorinated polymer dispersions with a higher solids content. For this reason, a large number of concentration processes have already been developed for fluorinated polymer dispersions, but the sensitivity of such dispersions to shearing, which leads to coagulation, presents a particular problem. Thus, according to U.S. Pat. No. 3,316,201, concentrates can be obtained by gentle evaporation with exclusion of air, but these concentrates have the disadvantage that, together with the subsequently added stabilizing emulsifiers, they also still contain all the concomitant substances originating from the polymerization. Attempts have already been made earlier to avoid the disadvantages, resulting from these concomitant substances on commercial use of such dispersions, with regard to stability to heat, film formation, toxicity and coagulate formation during the evaporation, by so-called settling processes or layer separation processes. In such processes, a concentrated phase is caused to separate out by adding nonionic stabilizing agents, such as, for example, condensation products of phenols or alkanols with ethylene oxide (U.S. Pat. No. 3,037,953), and basic electrolytes, whilst warming, and this phase can then be separated off from the supernatant serum. The disadvantages of this procedure are the increased tendency, arising during the warming, towards coagulation, the tendency of the concentrate to continue the settling process after being separated off and the fact that the basic electrolyte remains in the concentrated dispersion. Attempts have been made to eliminate these disadvantages by initially adding some of the stabilizing agent in the form of a selected group of ethoxylated alkylphenols, separating the layers by moderate warming to slightly above room temperature and adding a further portion of stabilizing agent to the concentrate after separating the layers. However, these measures, which are described in U.S. Pat. No. 3,301,807, lead to an undesired increase in the content of stabilizing agent and in the viscosity of the concentrated dispersion.

Attempts have also already been made to effect concentration of fluorinated polymer dispersions by removing water by means of water-bonding substances, such as, for example, by solid ion exchanger resins (German Pat. Specification No. 1,081,221) or by dehydrating compounds, such as glycerol, polyglycols or reaction products of ethylene oxide and propylene oxide with alcohols, fatty acids, amines and the like (German Auslegeschrift No. 1,694,616). Difficulties result in this procedure since it is desirable or even necessary to remove these water-bonding substances from the dispersion before it is put to further use.

Finally, attempts have also already been made to obtain concentrated aqueous polytetrafluoroethylene dispersions with low contents of concomitant substances by the electrodecantation process (British Patent Specification No. 642,025). The disadvantages here are, however, that each formation of coagulate or coating on the electrodes leads to interruption of current, and that this process gives only exceptionally low space/time yields.

There is thus still a need for a process which permits the preparation of concentrated, colloidal fluorinated polymer dispersions containing fluorine-containing emulsifiers, in a simple and economic manner avoiding the abovementioned disadvantages, and in particular high space/time yields should be aimed at and undesired contents of concomitant substances in the concentrated dispersions should be avoided or reduced. One object of the present invention is to remedy this need, and a further is to recover as far as possible the content of fluorine-containing emulsifier obtained on concentrating the aqueous phase, in order to avoid losses of these expensive substances or to keep the losses low. Finally, a still further object of this invention is to avoid losses of the stabilizing emulsifiers required for the concentration, or to keep these losses low.

According to the present invention, these objects are accommodated by a process which comprises circulating the fluorinated polymer dispersion, after the addition of 0.5 to 12% by weight of a stabilizing emulsifier, relative to the polymer solids weight of the dispersion, over units of semi-permeable ultrafiltration membranes, conveying of the dispersion in circulation with conveying rates of 2 to 7 m/sec being effected by pumps which keep the fluorinated polymer dispersion free from contact with components which cause frictional forces, and thus separating the dispersion into a fluorinated polymer dispersion concentrate and an aqueous permeate which contains parts of the fluorine-containing emulsifier and of the stabilizing emulsifier, removing the resulting fluorinated polymer dispersion concentrate from the circulation, and removing the aqueous permeate separately from the circulation and optionally passing said permeate to recovery operations to obtain the portions of fluorine-containing emulsifier and stabilizing emulsifier contained therein.

It is indeed known that dispersions and latices of naturally occurring macromolecular substances, such as, for example, of proteins and carbohydrates, and also of a number of synthetic high polymers, such as, for example, of polyvinyl chloride or of copolymers of vinyl chloride, can be concentrated with the aid of the ultrafiltration process, as described, for example, in German Offenlegungsschrift Nos. 2,440,643 and 2,420,922. However, fluorinated polymer dispersions are never mentioned in this connection. The reason for this is evidently that fluorinated polymer dispersions, in particular polytetrafluoroethylene dispersions, already tend to coagulate on application of relatively low shearing forces, and such a coagulation is in all cases undesirable, that is to say also in the case of concentration by ultrafiltration, since it gives rise to losses of very expensive materials. It could not be expected that colloidal fluorinated polymer dispersions can be conveyed and circulated over the necessary prolonged period at the high flow rate required for ultrafiltration with the aid of pumps without a relatively large amount of coagulate being formed. Surprisingly, however, this is possible if special pumps are used in which care is taken that the dispersion does not come into contact, or essentially does not come into contact, with components of the pump which are moved mechanically against one another and thereby produce frictional forces. Such components producing frictional forces are, above all, conventional sealing elements at the shaft gland. When the dispersion penetrates into the thin cracks of such sealing elements, it is obviously exposed to such high shearing forces that increased coagulation takes place at this point and spreads inside the liquid, whilst the conveying units of the pumps themselves surprisingly exhibit no such effect.

Pumps in which, according to the process of the invention, the fluorinated polymer dispersions can be kept free from contact with such surfaces or components producing friction are, for example, so-called peristaltic pumps (compare the description in G. Leuschner: "Kleines Pumpen-Handbuch" ("Small Pump Handbook"), Verlag Chemie GmbH, Weinheim, Federal Republic of Germany, 1967, pages 248 to 250). However, these are preferably centrifugal pumps with a so-called hydrodynamic shaft seal, as is shown by an example in FIG. 1 (cross-section). By the term "hydrobromic shaft seal", it is to be understood in this context that a relief impeller (2) is arranged in a centrifugal pump, in addition to the customary delivery impeller (1), and during operation of the pump, this relief impeller produces a vacuum in the region of the shaft gland when the ring valve (4) is open, which prevents liquid material to be conveyed penetrating into this shaft gland or even passing to the exterior from the shaft gland, whilst when the pump is at a standstill, sealing is effected by the ring valve, which is controlled via a centrifugal force regulator (5). Those centrifugal pumps with hydrodynamic shaft sealing which additionally have a continuously or intermittently operating reverse flow of water, that is to say water is forced inside the pump via the bore (3) as an additional safety measure against penetration, into the shaft gland, of liquid goods to be conveyed, are particularly preferred.

For conveying the goods in the ultrafiltration circulation, the necessary conveying rates of 2 to 7 m/sec, preferably 4 to 6 m/sec, by which the fluorinated polymer dispersions are conveyed through the semipermeable membranes or membrane systems which effect the separation and concentration, are produced with the aid of these pumps.

The choice of asymmetrically built-up membranes for the ultrafiltration is not critical with regard to their material composition. All the commercially available membranes can be employed, as long as they have an adequate stability to temperature and pH and a retention power (separation limit) with respect to particles with a particle diameter of $\geq 0.005$ μm, preferably of $\geq 0.01$ μm. In practice, membranes which have an average pore diameter in the layer which effects separation which is 0.1 times, preferably 0.5 times, that of the smallest particle diameter occurring in the dispersion are chosen for this. These membranes are, for example, membranes of cellulose acetate, polyamide, polysulfone and polyacrylonitrile, and of fluorinated polymers, such as polytetrafluoroethylene, polyvinylidene fluoride, polyvinyl fluoride and polytrifluorochloroethylene, and fluorine-containing copolymers of tetrafluoroethylene/hexafluoropropylene/vinylidene fluoride, tetrafluoroethylene/ethylene and tetrafluoroethylene/perfluoro(alkylvinyl) ether/and optionally hexafluoropropylene, and furthermore chlorotrifluoroethylene/ethylene, tetrafluoroethylene/vinyl acetate or tetrafluoroethylene/perfluorovinylsulfonic acids or perfluoroacrylic acid.

Such membranes are employed in the ultrafiltration process in the form of membrane packages (modules). Flat membranes and, preferably, tube membranes (or hose membranes) can be used in the process according to the invention. These can be combined to relatively large units of several or many individual modules, which are incorporated within the circulation in parallel or in series.

The pressure build-up produced at the inlet of the membranes or membrane packages with the aid of the said pumps is between about 1.0 and 9.0 bars, depending on the delivery capacity and the tube cross-section, and the pressure gradient between the membrane inlet and membrane outlet is about 0.5 to 2.5 bars. The operating temperature in the ultrafiltration circulation of the process according to the invention can be chosen within fairly wide limits, in fact between 5° and 90° C., but the ultrafiltration is preferably carried out at somewhat elevated temperatures, that is to say between 20° and 85° C. and in particular between 40° and 80° C., whereupon the rate of the process can be increased.

It is necessary to add a stabilizing emulsifier or a mixture of such substances to stabilize the fluorinated polymer dispersions during the process itself and the concentrated dispersions which are later obtained and from which some or optionally essentially the entire amount of fluorine-containing emulsifier has been removed. This addition is appropriately effected before introduction of the dispersions to be concentrated into the circulation of the ultrafiltration, and in particular either by adding the entire amount or by adding a part amount and by subsequently charging the dispersion with the remainder in portions.

The stabilization of fluorinated polymer dispersions with the aid of stabilizing emulsifiers (dispersion stabilizers) is known. Within the scope of the process according to the invention, both non-ionic and anionic or cationic surface-active compounds can be employed for this purpose, fluorine-free compounds in general being preferred for economic reasons.

Non-ionic stabilizing emulsifiers which can be used for this purpose are described in detail, for example in U.S. Pat. No. 3,925,292. Examples which may be mentioned here are: alkylphenol oxyethylates of the general formula

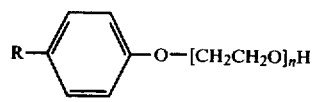

in which n=4 to 20 and R is an alkyl radical with 4 to 20 C atoms, and some of the ethylene oxide units can be replaced by propylene oxide units; fatty alcohol oxyethylates of the general formula

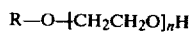

in which n=4 to 20 and R is an alkyl radical with 4 to 20 C atoms, and some of the ethylene oxide units can be replaced by propylene oxide units; and ethylene oxide/propylene oxide block copolymers of the general formula

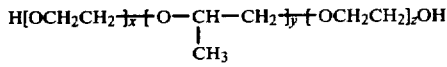

in which x=2 to 20, y=10 to 50 and z=2 to 20. Non-ionic condensation products of amines, in particular fatty amines, or of fatty acid esters with ethylene oxide or mixtures of ethylene oxide and propylene oxide can also be used. Anionic surface-active agents which can be employed, in the scope of the process according to the invention, as stabilizing emulsifiers and which may be mentioned are alkylsulfonates and alkyl sulfates, alkylarylsulfonates and alkylaryl sulfates, salts of higher fatty acids, phosphoric acid alkyl or alkylaryl esters, oxyalkylated sulfonic acids or salts thereof and sulfosuccinic acid esters or salts thereof. Surface-active agents which are suitable as cationic stabilizing emulsifiers are, in particular, the ammonium salts of longchain secondary and tertiary fatty amines. Non-ionic stabilizing emulsifiers are preferred. Mixtures of the abovementioned classes of stabilizing emulsifiers can also be employed.

These stabilizing emulsifiers are added to the fluorinated polymer dispersion to be concentrated in a concentration of 0.5 to 12% by weight, preferably 2 to 8% by weight and in particular 2 to 5% by weight, relative to the fluorinated polymer solids weight in the dispersion. If, especially in the case of a continuous procedure, subsequent charging of the dispersion with these stabilizing emulsifiers is considered, care must be taken that this concentration is essentially maintained in the circulation.

Figure 2:
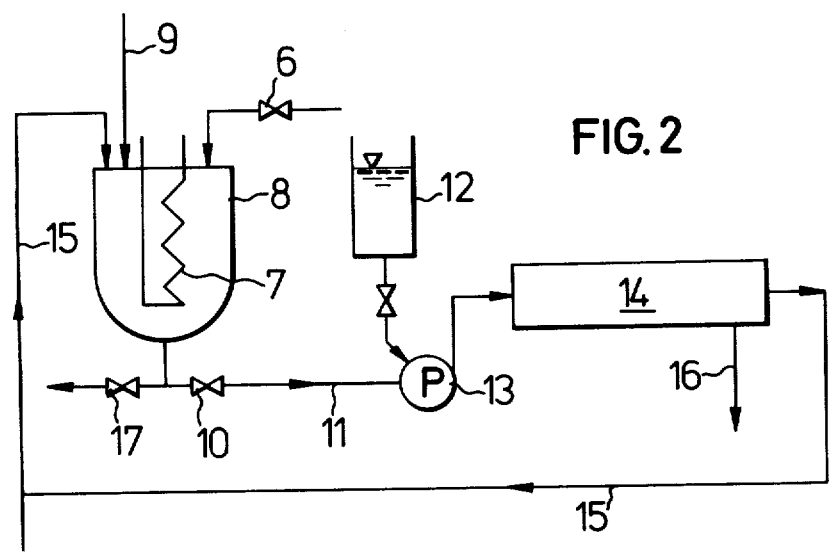

The process according to the invention will be illustrated with the aid of the flow diagram in FIG. 2. The aqueous starting dispersion of the fluorinated polymer which has a polymer solids content of 5 to 40% by weight, preferably 10 to 30% by weight, is filled via an inlet valve (6) into a stock vessel (8) which is temperature-controlled by means of an immersed cooler (7). The stabilizing emulsifier is added in aqueous solution via line (9). The fluorinated polymer dispersion subsequently stabilized in this manner is conveyed from the stock vessel via valve (10) and line (11) through the semi-permeable tube membrane unit (14) with the aid of a centrifugal pump (13) which has hydrodynamic shaft sealing and is provided with a flow of water from the stock vessel (12), and is recycled, in circulation, via line (15) into the stock vessel (8), the aqueous permeate, which contains fluorine-containing emulsifier and stabilizing emulsifier, leaving the tube membrane unit and thus the circulation via line (16). This conveying, in circulation, of the fluorinated polymer dispersion to be concentrated is continued until the desired polymer solids content of 35 to 75% by weight, preferably 40 to 65% by weight, is achieved, an amount of permeate of 20 to 600 l/m² of membrane surface being achieved, depending on the nature of the membrane material, the nature of the fluorinated polymer dispersion and of the fluorine-containing emulsifiers contained therein and of the stabilizing emulsifiers added, and depending on the process conditions (pressure, temperature, conveying rate). The concentrated fluorinated polymer dispersion is then removed from the circulation via the discharge cock (17). The permeate which leaves the membrane unit during the entire circulation process is collected outside the system and can be fed to any suitable separation and recovery operation.

In a preferred embodiment, this process can be designed as a continuous process. For this, the process is first carried out as above until the desired degree of concentration is achieved. From this point in time on, it is necessary to subsequently feed in dilute starting dispersion in a volume substantially equal to the sum of the volumes of concentrate and permeate removed.

In a further particularly preferred embodiment of the process, the concentration by ultrafiltration in circulation is first carried out up to or almost up to the desired degree of concentration and water is then subsequently added continuously or in portions at intervals of time, further portions of stabilizing emulsifier appropriately being added to this water, and in particular in an amount about equal to the portion removed via the permeate. In this way, it is possible to separate off particularly high portions of fluorine-containing emulsifier from the fluorinated polymer dispersions to be concentrated and to pass this emulsifier to the recovery operation.

Depending on the nature of the starting dispersion and on the starting concentration of fluorine-containing emulsifier contained therein, in the process according to the invention, especially in the case of a continuous procedure, about 20 to 75% by weight, and in the variant described in which water is subsequently supplied more than 80% by weight, of the starting amount of fluorine-containing emulsifier can be separated off and passed to the recovery operation.

In principle, all types of fluorine-containing homopolymer and copolymer dispersions or also of mixed dispersions of homopolymers and copolymers can be separated by the process according to the invention. In this context, there may be mentioned in particular colloidal dispersions of copolymers of tetrafluoroethylene which can be processed from the melt, especially those of tetrafluoroethylene/hexafluoropropylene, tetrafluoroethylene/perfluoro(alkylvinyl) ethers with perfluoroalkyl radicals having 1 to 5 C atoms, in particular perfluoro(n-propyl-vinyl) ethers, tetrafluoroethylene/ethylene, tetrafluoroethylene/trifluorochloroethylene, trifluorochloroethylene/ethylene, tetrafluoroethylene/vinylidene fluoride and hexafluoropropylene/vinylidene fluoride, and colloidal dispersions of terpolymers of tetrafluoroethylene/perfluoro(alkylvinyl) ether/hexafluoropropylene, tetrafluoroethylene/ethylene/hexafluoropropylene and tetrafluoroethylene/vinylidene fluoride/hexafluoropropylene, or of quaternary polymers of tetrafluoroethylene/vinylidene fluoride/hexafluoropropylene/perfluoro(alkylvinyl) ethers. However, it is likewise also possible to concentrate dispersions of polyvinyl fluoride, polyvinylidene fluoride, polytrifluorochloroethylene, poly(fluoroacrylates) or poly(fluoromethacrylates) or of copolymers of such fluoroacrylates and fluoromethacrylates with other monomers. The process according to the invention is preferably applied to the known dispersions of polytetrafluoroethylene, that is to say of the homopolymer which cannot be processed from the melt and which can optionally contain modifying comonomers, such as hexafluoropropylene or perfluoro(alkylvinyl) ethers or chlorotrifluoroethylene, in small proportions (0.1 to 3 mol %), and furthermore to the abovementioned copolymer dispersions of tetrafluoroethylene/perfluoro(alkylvinyl) ether, tetrafluoroethylene/perfluoro(alkylvinyl) ether/hexafluoropropylene, tetrafluoroethylene/vinylidene fluoride/hexafluoropropylene and tetrafluoroethylene/ethylene/hexafluoropropylene. Finally, colloidal dispersions of so-called fluorinated telomer waxes which can be prepared by telomerization of tetrafluoroethylene in aqueous emulsion in the presence of chain propagation agents, for example by the process of German Patent Specification No. 2,235,885, can also be used in the process according to the invention.

When used as starting dispersions, these fluorinated polymer dispersions have a solids content of 5 to 40% by weight, preferably 10 to 30% by weight, and a particle size (particle diameter) range from 0.005 to 3 μm, preferably from 0.01 to 1 μm.

The fluorine-containing emulsifiers which are present in the fluorinated polymer dispersions as a result of the emulsion polymerization and which can be separated off and recovered partly or almost completely in the process according to the invention are salts of fluorinated or perfluorinated carboxylic acids, sulfonic acids or phosphonic acids, such as are described, for example, in U.S. Pat. No. 2,559,752. These are preferably salts of fluorinated alkanoic acids of the formula $XCF_2(CF_2)_nCOOM$ (X=H or Cl, n=3 to 10 and M=metal or $NH_4^+$), of fluorinated or perfluorinated alkanesulfonic acids of the formula $XCF_2(CF_2)SO_3M$ (X=H or, preferably, F, n=3 to 10 and M=metal or $NH_4^+$) and also salts of perfluorinated [(β-propoxy)-propionic acid], but in particular salts of perfluorinated alkanoic acids of the formula $CF_3(CF_2)_nCOOM$ (n=3 to 10 and M=metal, $NH_4^+$ or $NR_4^+$, in which R is a short-chain alkyl radical). Of the salts, the alkali metal salts, alkaline earth metal salts and ammonium salts are in turn preferred. Particularly preferred fluorine-containing emulsifiers are the alkali metal salts and ammonium salts of perfluorooctanoic acid. Mixtures of such fluorine-containing emulsifiers, especially those with perfluorooctanoic acid salts as the main constituent, can also be present and can be passed to the recovery operation.

The concentrated fluorinated polymer dispersions which result from the process according to the invention and have a solids content which is increased, compared with the starting dispersion, by at least 5% by weight, preferably 15% by weight and more, are immediately ready-to-use. The permeate removed from the circulation contains part, in some cases a high proportion, of the fluorine-containing emulsifier present in the starting dispersion, and the stabilizing emulsifier, in aqueous solution. This permeate can be passed to any desired separation and recovery operation for these substances.

In a preferred embodiment of the process according to the invention, the aqueous permeate which issues from the ultrafiltration membranes and contains fluorine-containing emulsifier and stabilizing emulsifier is passed over basic anion exchangers on which the fluorine-containing emulsifier is held and separated off from the aqueous filtrate, which flows out, the fluorine-containing emulsifier being recovered by subsequent elution of the basic anion exchanger.

In a further preferred embodiment of the process according to the invention, the aqueous filtrate which flows out of the basic anion exchanger and contains stabilizing emulsifier is fed to a reverse osmosis unit and in this unit is passed in circulation over semipermeable membranes with a retention capacity for molecular weights of at least 100 and is concentrated under a pressure in the range from 10 to 80 bars. If desired, this concentrate thus obtained from the reverse osmosis can be recycled into the ultrafiltration process.

Figure 3:
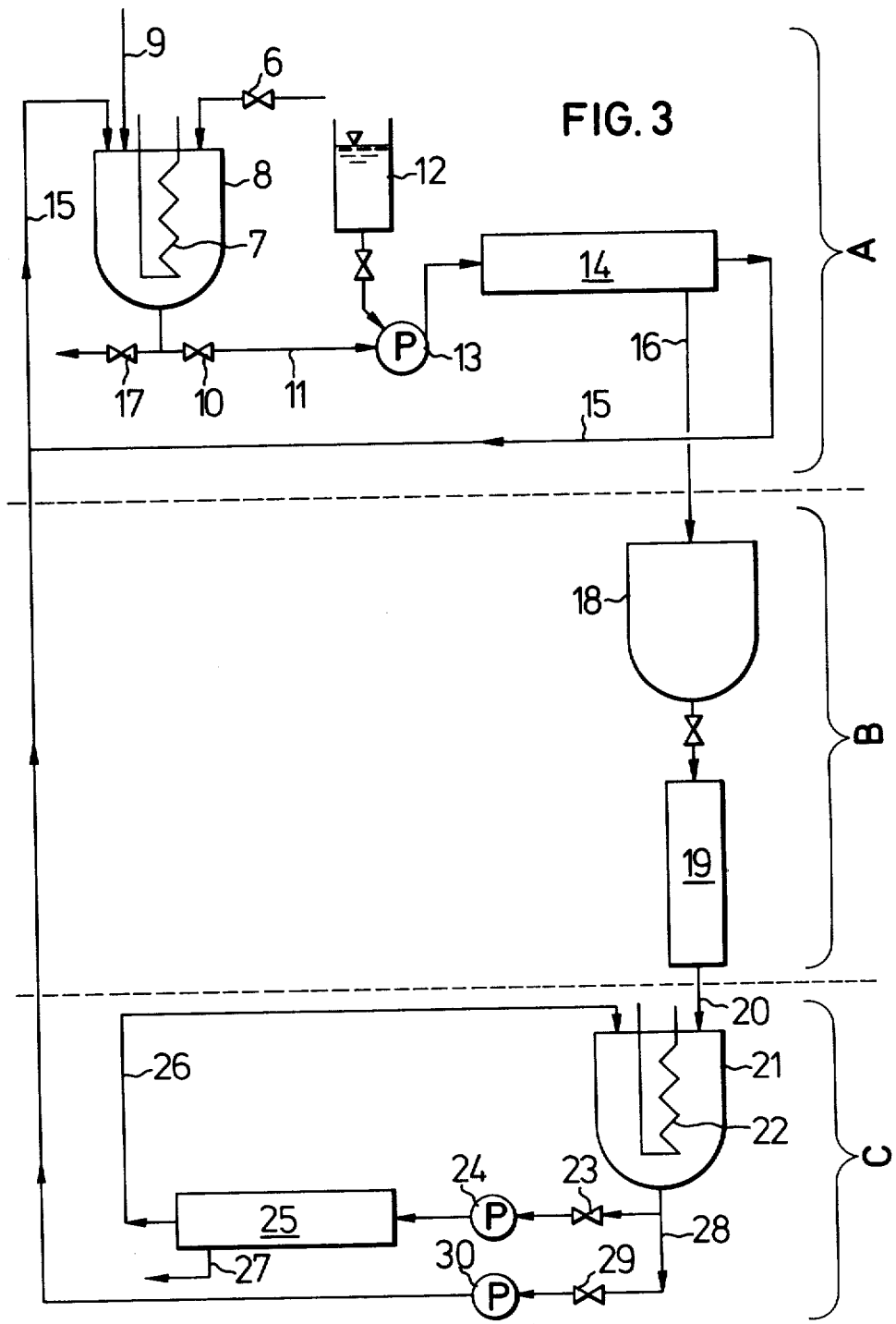

This particular recovery process for the fluorine-containing emulsifier and the stabilizing emulsifier is illustrated by way of example in the flow diagram of FIG. 3, other variations also of course being possible within the scope according to the invention. The aqueous permeate issuing from the ultrafiltration process (FIG. 3, Section A) is first fed via line (16) to an intermediate vessel (18)(FIG. 3, Section B) and from this is then passed over a basic anion exchanger (19) on which the fluorine-containing emulsifier can be adsorbed by known processes and then isolated by elution and recovered. A weakly basic anion exchanger (as described in German Auslegeschrift No. 2,044,986), from which the fluorine-containing emulsifier can be eluted by means of dilute ammonia solution or with the aid of mixtures of concentrated mineral acid and organic solvents (as proposed in German Patent Application P 29 03 981.4) is preferably employed for this purpose.

After the fluorine-containing emulsifier has been separated off in the manner described, the aqueous filtrate leaving the anion exchanger (19) now still contains only essentially those proportions of stabilizing emulsifier which left the ultrafiltration via the aqueous permeate. In a further preferred embodiment of the invention, this aqueous filtrate is fed to a reverse osmosis operation for the purpose of concentration and recycling into the process. For this reverse osmosis operation, this aqueous filtrate leaving the anion exchanger via line (20) is first fed to a stock vessel (21) (compare FIG. 3, Section C) which is provided with an immersed cooler (22). When the valve (23) is open, the filtrate, which here in general contains the stabilizing emulsifier in a concentration of 0.5 to 20 g/l, preferably of 1 to 10 g/l, passes from the stock vessel into the reverse osmosis circulation and is conveyed, by means of a pump (24), over the tube membrane unit (25) of the reverse osmosis apparatus (or over several of these units) and via line (26) back into the stock vessel (21). This reverse osmosis apparatus can be operated in a manner which is in itself known. The pressure, produced by the pump, in front of the membrane is in the range from 10 to 80 bars, preferably from 10 to 70 bars. The reverse osmosis can be carried out in a temperature range from 10° to 80° C., preferably from 20° to 50° C., and in a pH range from 2 to 8. In principle, all asymmetric membranes with a retention capacity towards dissolved substances with a molecular weight > 100, that is to say a separation limit below the molecular weight of the stabilizing emulsifier employed, are suitable for concentrating the stabilizing emulsifier by the reverse osmosis process. Those types of membrane which can also be used in the ultrafiltration, in particular membranes of cellulose acetate, polyamide and polysulfone, are also suitable with regard to their material composition. The membranes are also usually collected together to form units (modules) in the case of the reverse osmosis, and flat membranes, if appropriate hollow-fibre membranes, and, preferably, tube membranes (hose membranes) are also used, but their design and position in the apparatus are more resistant to pressure than is necessary in the case of the ultrafiltration process. If the stabilizing emulsifier is separated off in a basic anion exchanger and then concentrated as described, a cationic or, preferably, a nonionic stabilizing emulsifier of the abovementioned groups is to be employed as the stabilizing additive to the fluorinated polymer dispersion.

The aqueous reverse osmosis permeate leaving the reverse osmosis membrane is in general so pure that it can be passed without danger via line (27) to the effluent (FIG. 3, Section C). After reaching a concentration of 50 to 150 g/l, preferably of 60 to 100 g/l, of stabilizing emulsifier, the stabilizing emulsifier concentrate conveyed in circulation is removed from the intermediate vessel via line (28) and the outlet valve (29) and can be put to any desired further use. However, it is preferably recycled by means of a pump (30) into the process of concentration by ultrafiltration and can there be used again for stabilizing the starting dispersion.

The concentration of the aqueous filtrate containing stabilizing emulsifier can also be carried out continuously by a procedure in which the reverse osmosis is first carried out up to a desired degree of concentration. The aqueous filtrate is then subsequently added in that proportion by volume which corresponds to the sum of the proportions by volume of stabilizing emulsifier concentrate and reverse osmosis permeate continuously removed. The stabilizing emulsifier is thereby kept at a uniform degree of concentration, which is particularly advantageous in the case of recycling into the starting dispersion.

Figure 4:
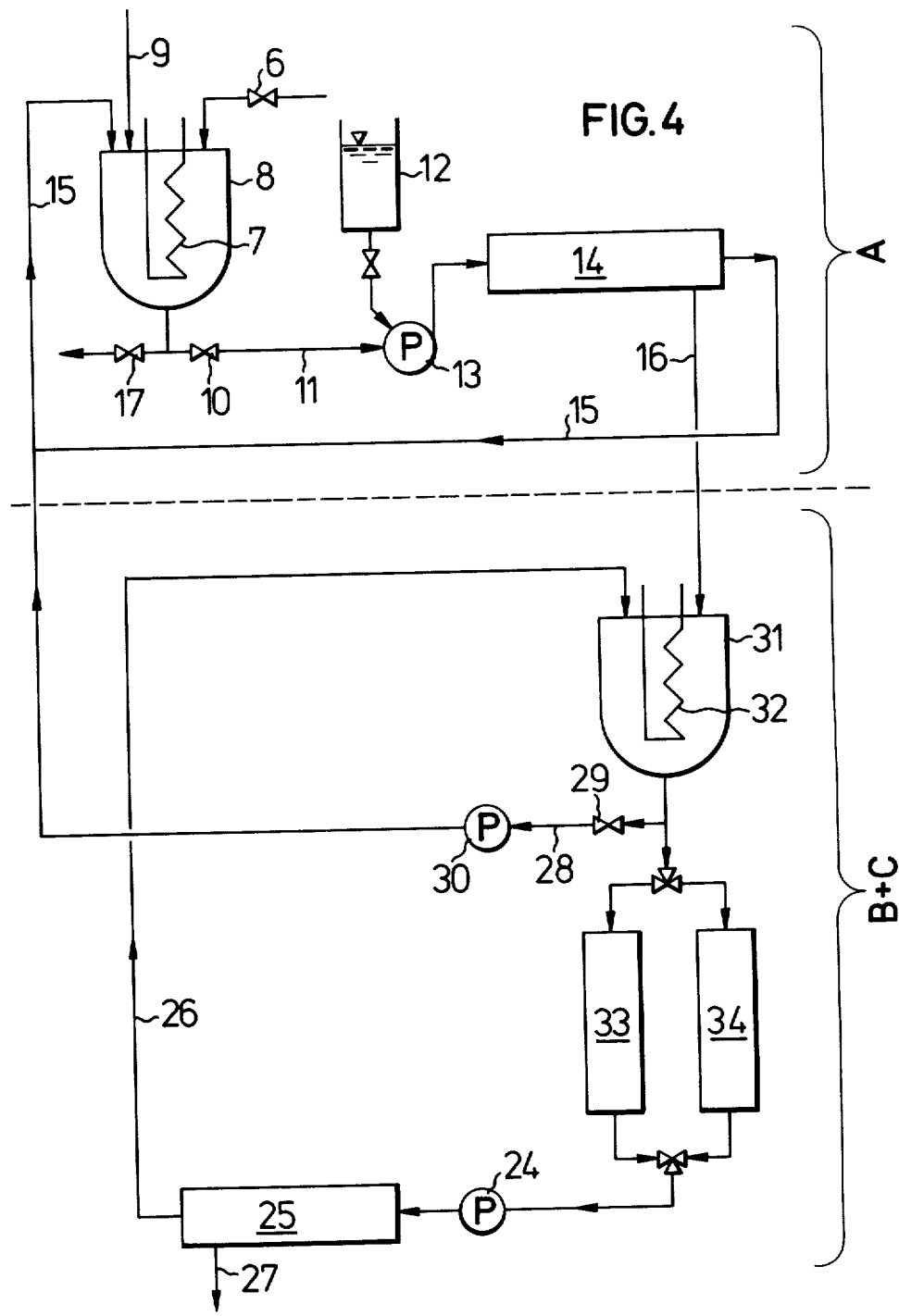

According to a further preferred embodiment of the process, the aqueous filtrate flowing out of the basic anion exchanger is circulated over the reverse osmosis apparatus and the basic anion exchanger (compare FIG. 4, Section B plus C). By this measure, that is to say the combination of process sections B and C, it is also possible to recover very small amounts of fluorine-containing emulsifier which are not yet held on the first pass through the basic anion exchanger. In this case, two basic anion exchangers (33) (34) are connected in parallel after the intermediate vessel (31), which is provided with an immersed cooler (32), so that the anion exchanger can be subjected to the charging operation and eluting operation and, if appropriate, the regeneration operation as a cycle. When the concentration of the stabilizing emulsifier in the reverse osmosis (24, 25, 26) has ended, the concentrate obtained is in this case also removed via the outlet valve (29) and via line (28) and is preferably recycled, by means of the pump (30), into the ultrafiltration process, where it can be employed again for the stabilization.

The process according to the invention described in detail in this manner provides a number of noteworthy advantages, especially as a result of the combination, according to the invention, of the process steps of ultrafiltration, separation on the basic anion exchanger and reverse osmosis:

1. It enables fluorinated polymer dispersions to be concentrated in high space/time yields with a comparatively fairly low space and investment requirement.

2. It is associated with a considerable saving in energy, since no evaporation energy has to be used.

3. It enables the valuable fluorine-containing emulsifiers, which were hitherto lost on further use of fluorinated polymer dispersions, to be recovered from the polymer-free permeate of the ultrafiltration process. The concentrated dispersions can even be separated off from these fluorine-containing emulsifiers down to low residues by a variant of the process.

4. The portions of stabilizing emulsifier which remain in the aqueous phase after the concentration can be recycled into the process in an appropriate manner, whereupon not only is a valuable substance obtained, but also pollution of the effluent is avoided.

5. In contrast to the known settling and layer separation methods, there are no restrictions to the choice of stabilizing emulsifier with regard to the solubility properties or the turbidity point.

6. The concentration process by ultrafiltration can be carried out at room temperatures. Colloidal dispersions with relatively large primary particles (up to 1 $\mu$m and more) and thus with a low stability, such as are required for achieving increased film thicknesses, can thus also be used in this process. The sintering losses arising when such dispersions are used for coating are significantly lower than are observed in the case of dispersions concentrated by known processes.

7. A considerable reduction in the amount of stabilizing emulsifier required is made possible by the concentration process according to the invention. Discoloration of sintered products manufactured therefrom can thereby be avoided and, for example, adhesion improvements can be achieved when impregnated glass fiber fabrics produced using concentrated dispersions of this type and with laminates produced therefrom by subsequent sintering on of polytetrafluoroethylene films. However, it is of course also possible to obtain concentrated fluorinated polymer dispersions with a higher proportion of stabilizing emulsifier if this is of advantage for the envisaged further use. Such dispersions have, for example in the case of coatings, the advantage of an improved film formation.

8. Finally, surprisingly, virtually no coagulate formation from the fluorinated polymer dispersion takes place at all, even over relatively long periods, in the case of the process carried out according to the invention. Not only are losses of expensive and valuable material thereby avoided, but also the process is largely insusceptible to trouble.

Fluorinated polymer dispersions which have a high solids content and at the same time an exceptionally low content of fluorine-containing emulsifiers and a very low content of stabilizing emulsifiers are obtained by the concentration process described. These aqueous, colloidal fluorinated polymer dispersions are a further subject of the invention. They have a high polymer solids content of 35 to 75% by weight, preferably of 40 to 65% by weight, relative to the total weight of the aqueous dispersion, and they contain 0 to 1% by weight of fluorine-containing emulsifier and 0.5 to 4% by weight of stabilizing emulsifier, in each case relative to the solids. A content of 0% by weight is to be understood as meaning that virtually no further fluorine-containing emulsifier is present and that this cannot be detected analytically. In particular, these are colloidal, aqueous dispersions of polytetrafluoroethylene which cannot be processed from the melt, can optionally contain up to 3% by weight of a modifying comonomer and has the solids content mentioned, which contain 0 to 0.19% by weight, preferably 0 to 0.01% by weight, of fluorine-containing emulsifier and 0.5 to 3% by weight, preferably 1 to 3% by weight, of stabilizing emulsifier, in each case relative to the solids. Furthermore, these are, in particular, colloidal, aqueous dispersions of a copolymer of tetrafluoroethylene which can be processed from the melt and have the solids content mentioned, which contain from 0 to 0.19% by weight, preferably 0 to 0.1% by weight, of fluorine-containing emulsifier and 0.5 to 5% by weight, preferably 1 to 3% by weight, of stabilizing emulsifier, in each case relative to the solids content. By copolymers of tetrafluoroethylene which can be processed from the melt there are to be understood, in particular, those with the abovementioned monomers. The fluorine-containing emulsifiers are preferably the alkali metal salts, alkaline earth metal salts and ammonium salts of perfluorooctanoic acid or such salts of mixtures of perfluorinated alkanoic acids with 3 to 10 C atoms in which perfluorooctanoic acid is the main constituent (>50% by weight). Those stabilizing emulsifiers of the non-ionic type are preferred.

The fluorinated polymer dispersions according to the invention which have a low content both of fluorine-containing emulsifiers and of stabilizing emulsifiers are distinguished, when used for the manufacture of coatings and impregnating agents, by a reduced corrosive action on metal components, a reduced toxicity and an increased stability to heat, and an improved adhesion in the case of the manufacture of laminates.

The invention is illustrated by the following examples:

EXAMPLES

1. Working instructions for the ultrafiltration (Compare the flow diagram in FIG. 2)

Unless indicated otherwise in footnotes, the procedure followed in Examples 1 to 18 of Table I was as according to the following working instructions: A polytetrafluoroethylene dispersion (or in Examples 12 to 15 a copolymer dispersion of the composition indicated in the appropriate footnotes) with a solids content of 20% by weight and a content of 0.3% by weight, relative to these solids, of the ammonium salt of perfluorooctanoic acid is filled via inlet valve (6) into the stock vessel (8), the temperature of which is controlled by means of the immersed cooler (7). After adding the stabilizing emulsifier (for the amount and nature see Table I) via line (9), the starting dispersion is conveyed with the aid of a centrifugal pump (13) (RCE type, delivery capacity 16 m³/hour, manufacturer: Messrs. Rheinhütte; for deviations see the footnote for Example 4) provided with a flow of water (12), through two semi-permeable tube membranes (14) (consisting of polyvinylidene fluoride; individual length 140 cm, diameter 2.5 cm, area 0.2 m²) arranged in parallel, in circulation and back into the stock vessel (8). Pressures up to 4.5 bars on the inlet side of the membrane system and up to 2.5 bars on its outlet side are thereby produced. A three-stage procedure is chosen in Example 3 to remove all of the fluorine-containing emulsifier. In this case, about 85 l of water are again added to the concentrated dispersion (containing 56% by weight of solids) obtained in the first pass and the amount of stabilizing emulsifier lost via the permeate is replenished. The same procedure is followed after the second pass.

The permeate emerging during the concentration operation is passed to the intermediate vessel (18) for the purpose of recovering the fluorine-containing emulsifier and the stabilizing emulsifier. When the desired solids content is reached (for the values see Table I), the concentrated dispersion is removed from the system via the discharge cock (17).

In the table, the following abbreviations have been used for the stabilizing emulsifiers employed:

A = p-isooctylphenol, oxyethylated with on average 10 ethylene oxide units (commercial product Triton ® X 100; manufacturer: Messrs. Rohm & Haas)

B = p-isooctylphenol, oxyethylated with 6 to 8 ethylene oxide units (Triton ® X 114; manufacturer: Messrs. Rohm & Haas)

C = block copolymer of ethylene oxide units (80% by weight) and propylene oxide units (20% by weight), molecular weight about 6,600 to 9,300 (commercial product Genapol ® PF 80; manufacturer: Hoechst AG)

D = isotridecanol, oxyethylated with 8 ethylene oxide units (commercial product Genapol ® X 080; manufacturer: Hoechst AG)

E = block copolymer of ethylene oxide units (40% by weight) and propylene oxide units (60% by weight), molecular weight about 3,100 to 3,700 (commercial product Genapol ® PF 40; manufacturer: Hoechst AG)

F = (coconut alkyl)-amine, oxyethylated with 5 ethylene oxide units (commercial product Genamin ® C 050; manufacturer: Hoechst AG)

The following methods were used to determine the properties, indicated in the last three columns of Table I, of the concentrated fluorinated polymer dispersions:

(α) Solids content

This is ascertained by determining the sintering residue. The already dried dispersion is then sintered at 380° C. for three hours, and after a cooling time of three-quaters of an hour in a desiccator, the sintering residue is weighed.

(β) Viscosity

The determination is carried out in a rotary viscosimeter of the Rotovisko type from Messrs. Gebrüder Haake KG, Berlin, with a N V measuring unit. The measuring beaker of the rotary viscosimeter is filled with 7 cm³ of thoroughly mixed dispersion and connected to a thermostat which is adjusted to 20° C. Measuring head 50 is used. Measurement starts at the switch position with the lowest speed of rotation (rotation factor 162) and is continued up to the highest speed of rotation (rotation factor 1). The scale values read off at each switch position of the speed of rotation are multiplied by the particular rotation factor and a further factor which represents the influence of the measuring head and the measuring beaker (0.0631 for the measuring head used). This gives the viscosity value in cP. The scale values read off, multiplied by a calibration factor given by the manufacturer of the apparatus (in this case 1.66) gives the shearing stress τ. These τ values are plotted against the viscosity values determined and the point read off from this curve at a value τ=50 is the viscosity in cP, measured at a shearing stress of 50 dynes/cm², as indicated in Table I.

(γ) Film formation

The dispersion is sprayed, in various thicknesses, onto three de-greased aluminum plates, the plates are then dried first at 90° C. for 15 minutes and then at 250° C. for 30 minutes and finally sintering is carried out at 400° C. for 30 minutes. The various coating thicknesses are measured and the coating thickness at which the first cracks appear is established.

TABLE I

Concentration of aqueous fluorinated polymer dispersions

| Example No. | Temperature (°C.) | Stabilizing emulsifier additive (% by weight, relative to the solids) | Time (hours) | Rate of removal of the permeate l/hour[8] | | | | Contained in the permeate (% by weight, relative to the starting amount) | | Concentrated dispersion | | |
|---|---|---|---|---|---|---|---|---|---|---|---|---|
| | | | | start | middle | end | average | Fluorine-containing emulsifier | Stabilizing emulsifier | solids (% by weight) | viscosity (mPa.s) | film formation up to μ |
| 1 | 20 | A(5.7) + C(1.3) | 5.6 | 29 | 10 | 8 | 18 | 45 | not determined | 57.8 | 14 | 20 |
| 2 | 40 | A(5.7) + C(1.3) | 4.0 | 43 | 20 | 15 | 28 | 40.5 | 31 | 56.3 | 10 | 12 |
| 3 | 25 | A(5.7) + C(1.3) | 3 · 5.2 | 41 | 13 | 10 | 19[10] | 81.5 | 3 · 31 | 56.3 | 10 | 12 |
| 4[1] | 40 | D(4) | 13.8 | 180 | 120 | 60 | 80 | 70 | 27 | 58.6 | 13 | 25 |
| 5 | 80 | A(4.5) + C(1.3) | 3.2 | 40 | 32 | 20 | 31 | 50 | 18 | 57.4 | 10 | 7 |
| 6 | 25 | F(5) | 4.0 | not determined | | | | 22 | 12 | 35.0 | not determined | |
| 7 | 25 | E(5) | 4.0 | 35 | 29 | 20 | 25 | 70 | 11 | 59.7 | 19 | 10 |
| 8 | 25 | G(5) | 5.0 | 29 | 18 | 13 | 20 | 95[9] | | 60.5 | 19 | 10 |
| 9[2] | 25–35 | A(4.5) + C(1.3) | 3.6 | 43 | 31 | 25 | 28 | 20 | 20 | 59.1 | 14 | 7 |
| 10[3] | 25–32 | A(4.5) + C(1.3) | 2.6 | 50 | 32 | 20 | 39 | 44 | 22 | 60.5 | 16 | 5 |
| 11[4] | 25–35 | A(4.5) + C(1.3) | 2.5 | 60–70 | 31 | 28 | 40 | 40 | 26 | 59.4 | 14 | 6 |
| 12[5] | 25 | B(10) | 9.7 | 38 | 25 | 10 | 13 | not determined | | 48.5 | 8 | not determined |
| 13[5] | 25 | A(5) | 2.7 | 46 | 30 | 25 | 28 | 43 | 32 | 50.0 | 19 | not determined |
| 14[6] | 25–35 | A(5) | 4.8 | 24 | 17 | 12 | 19 | 41 | 31 | 49.2 | 32 | not determined |
| 15[7] | 25 | A(5) | 5.0 | 24 | 15 | 10 | 18 | 40 | 30 | 50.0 | 30 | not determined |
| 16 | 25–30 | A(2.5) + C(1.5) | 4.1 | 31 | 26 | 13 | 23 | 70 | 23 | 60.6 | 16 | 10 |
| 17 | 25 | C(1.5) | 5.0 | 18 | 15 | 8 | 14 | 40 | 30 | 57.0 | 10 | 20 |
| 18 | 25 | C(1.5) | 4.0 | 28 | 20 | 15 | 21 | 42 | 28 | 59.0 | 14 | 19 |
| 19 | 30 | D(1.0) | 3.5 | 35 | 35 | 30 | 29 | 40 | 22 | 58.0 | 14 | 10 |
| 20[11] | 30 | A(5.0 + subsequent addition) | 15 | 35 | 29 | 19 | 25 | 98 | 30 | 59.0 | 18 | 10 |
| 21 | 35–40 | D(3.5) | 12 | 220 | 160 | 60 | 150 | 45 | 30 | 58.5 | 14 | 8 |
| 22 | 35–40 | D(3.5) | 12 | 195 | 140 | 80 | 130 | 55 | 57 | 59.0 | 12 | 8 |

Footnotes for Table I

[1]Centrifugal pump RCE, manufacturer: Messrs. Rheinhutte Wiesbaden; delivery capacity: 27 m³/hour; membrane area: 1.2 m²; permeate rate = average of all three passes
[2]Membrane: cellulose acetate
[3]Membrane: polyamide
[4]Membrane: polysulfone
[5]Copolymer dispersion of tetrafluoroethylene/perfluoro(n-propylvinyl) ether/hexafluoropropylene; 15% by weight of solids; 0.7% by weight of the $NH_4^+$ salt of perfluorooctanoic acid, relative to the solids
[6]Copolymer dispersion of tetrafluoroethylene/ethylene/hexafluoropropylene; 10% by weight of solids; 1.0% by weight of the $NH_4^+$ salt of perfluorooctanoic acid
[7]Copolymer dispersion of tetrafluoroethylene/vinylidene fluoride/hexafluoropropylene; 10% by weight of solids; 1.1% by weight of the $NH_4^+$ salt of perfluorooctanoic acid
[8]Rate at the start (0 to 25% of the permeate volume removed) in the middle (50%) and at the end (75 to 100%)
[9]Total amount of fluorine-containing emulsifiers and stabilizing emulsifiers determined
[10]Average of all 3 passes
[11]The concentration was first carried out down to a solids content of about 55% by weight. When this is achieved, water which contains 0.45% by weight of stabilizing emulsifier is subsequently added continuously in an amount corresponding to the amount of permeate removed.

(2.) Working instructions for adsorption and elution of the perfluorooctanoic acid (2.1) Absorption A glass column which is provided with a bottom frit and cock and has the dimensions indicated in Table II is filled with the volumes likewise indicated in Table II (=packing) of a weakly basic anion exchanger (Lewatit ® MP 62; manufacturer: Bayer AG), and the anion exchanger is converted into the chloride form with dilute 4% strength by weight hydrochloric acid and then washed with desalinated water until the runnings are neutral. The permeate leaving the ultrafiltration is adjusted to a pH value of 4 to 5 with dilute, aqueous hydrochloric acid and, for adsorption of the perfluorooctanoic acid contained therein, is allowed to run through the column under normal pressure under the conditions indicated in Table II.

(2.2) Elution of the perfluorooctanoic acid (Table III)

The abovementioned weakly basic anion exchanger charged with perfluorooctanoic acid is rinsed with desalinated water to remove residues of stabilizing emulsifier which remain and is then eluted with the amount of 1.5 N NH$_4$OH solution indicated in Table III. The resulting ammoniacal perfluorooctanoate solution is adjusted to a pH value of 1 with dilute hydrochloric acid, whilst stirring, and the crystals of perfluorooctanoic acid which have precipitated are separated off by filtration. The percentage proportion of perfluorooctanoic acid recovered, relative to the starting amount in the permeate from the ultrafiltration, is indicated in the last column of Table III.

TABLE II

| | | | | | Adsorption of perfluorooctanoic acid | | | | | |
|---|---|---|---|---|---|---|---|---|---|---|
| Permeate from Example No. | Anion height (cm) | exchanger cross-section (cm$^2$) | column packing (cm$^3$) | Initial stabilizing emulsifier (g/l) | concentration of perfluoro-octanoic acid (g/l) | Temperature (°C.) | Flow rate (l/hour) | Amount of solution (l) | Adsorption of perfluoro-octanoic acid | |
| | | | | | | | | | (g) | (%)* |
| 1 | 60 | 28 | 1680 | 9 | 1.5 | 25 | 2 | 40 | 60 | 87 |
| 2 | 60 | 28 | 1680 | 3 | 1.3 | 25 | 2 | 50 | 64 | 90 |
| 4 | 150 | 50 | 7500 | 3 | 1.0 | 25 | 5 | 210 | 210 | 80 |

TABLE III

| | Elution of perfluorooctanoic acid | | | |
|---|---|---|---|---|
| Ion exchanger filtrate from Example No. | NH$_4$OH solution (l) | Dropping rate (l/hour) | Perfluorooctanoic acid recovered | |
| | | | (g) | (%)* |
| 1 | 6 | 0.7 | 50 | 83 |
| 2 | 6 | 1 | 56 | 88 |
| 4 | 25 | 4 | 170 | 81 |

*%, relative to the amount in the starting permeate (3.) Working instructions for concentration of the aqueous solution of the stabilizing emulsifier by reverse osmosis The aqueous filtrate which is virtually free from perfluorooctanoic acid and originates from the basic anion exchanger is concentrated with the aid of a reverse osmosis unit for the purpose of recycling the stabilizing emulsifier into the ultrafiltration unit. For this concentration, the aqueous filtrate, from the basic anion exchanger, which has first been collected in a stock vessel (21) is passed in circulation over a reverse osmosis unit with a tube membrane of cellulose acetate, membrane area 4.5 m$^2$, at temperatures in the range from 20° to 25° C., under a pressure of 40 bars and at a pH value in the range from 4 to 5, and back into the stock vessel (21).

The following Table IV shows the values for the concentration achieved:

TABLE IV

| Filtrate from Example No. | Initial concentration | | | Starting concentration | | | Reverse osmosis | | permeate concentration (g/l) | Loss (%) |
|---|---|---|---|---|---|---|---|---|---|---|
| | solution (l) | amount (g) | concentration (g/l) | solution (l) | amount (g) | concentration (g/l) | solution (l) | amount (g) | | |
| 4 | 1100 | 3850 | 3.5 | 80 | 3340 | 42 | 1020 | 510 | 0.5 | 13 |

We claim:

1. Process for concentrating a colloidal dispersion of a fluorinated polymer which contains at least one fluorine-containing emulsifier, said process comprising the steps of
    (a) adding from 0.5 to 12% by weight of at least one stabilizing emulsifier calculated on the polymer solids weight of the dispersion,
    (b) circulating the dispersion over a semi-permeable ultra-filtration membrane to separate the dispersion into a fluorinated polymer dispersion concentrate and an aqueous permeate which contains part of the fluorine-containing emulsifier and the stabilizing emulsifier, said circulation being at a conveying rate of 2 to 7 meters per second and effected by pumps which keep the fluorinated polymer free from contact with components which cause frictional forces, and
    (c) separately removing said concentrate and said permeate.

2. Process as claimed in claim 1 wherein the fluorinated polymer dispersion concentrate and the aqueous permeate are removed continuously and the fluorinated polymer dispersion to be concentrated is added continuously in an amount corresponding to the sum of the volumes of concentrate and permeate removed.

3. Process as claimed in claim 1 wherein concentration is first carried out up to a predetermined degree of concentration, water is then added to the concentrate and concentration is again effected to a predetermined degree of concentration.

4. Process as claimed in claim 1 wherein the fluorine-containing emulsifier and stabilizing emulsifier contained in said permeate are recovered.

5. Process as claimed in claim 4 wherein said permeate is passed over a basic anion exchanger on which the fluorine-containing emulsifier is adsorbed and aqueous filtrate leaving said anion exchanger and containing stabilizing emulsifier is fed to a reverse osmosis unit where it is passed over a semi-permeable membrane to form a concentrate.

6. Process as claimed in claim 5 wherein said concentrate is recycled into the process for concentrating a colloidal dispersion.

7. Process as claimed in claim 1 wherein the stabilizing emulsifier is a non-ionic surface-active agent.

8. Process as claimed in claim 1 wherein the stabilizing emulsifier is a cationic surface-active agent.

9. Process as claimed in any one of claims 1 to 6 wherein the colloidal fluorinated polymer dispersion to be concentrated contains an alkali metal salt or ammonium salt of perfluorooctanoic acid as fluorine-containing emulsifier.

10. Process as claimed in claim 1 wherein the fluorinated polymer is polytetrafluoroethylene.

11. Process as claimed in claim 1 wherein the fluorinated polymer is a non-melt-processable polymer of tetrafluoroethylene and a small proportion of at least one other ethylenically unsaturated fluorinated comonomer.

12. Process as claimed in claim 1 wherein the fluorinated polymer is a melt-processable polymer of tetrafluoroethylene and at least one comonomer selected from the group consisting of hexafluoropropylene, perfluoro(alkylvinyl) ether, vinylidene fluoride and ethylene.

13. Process as claimed in claim 3 wherein in addition to said water, stabilizing emulsifier is added to the concentrate in an amount about equal to the portion which is removed via the aqueous permeate.

* * * * *